9065X
D. Warren,
Washing Machine,
Patented Aug. 27, 1835.
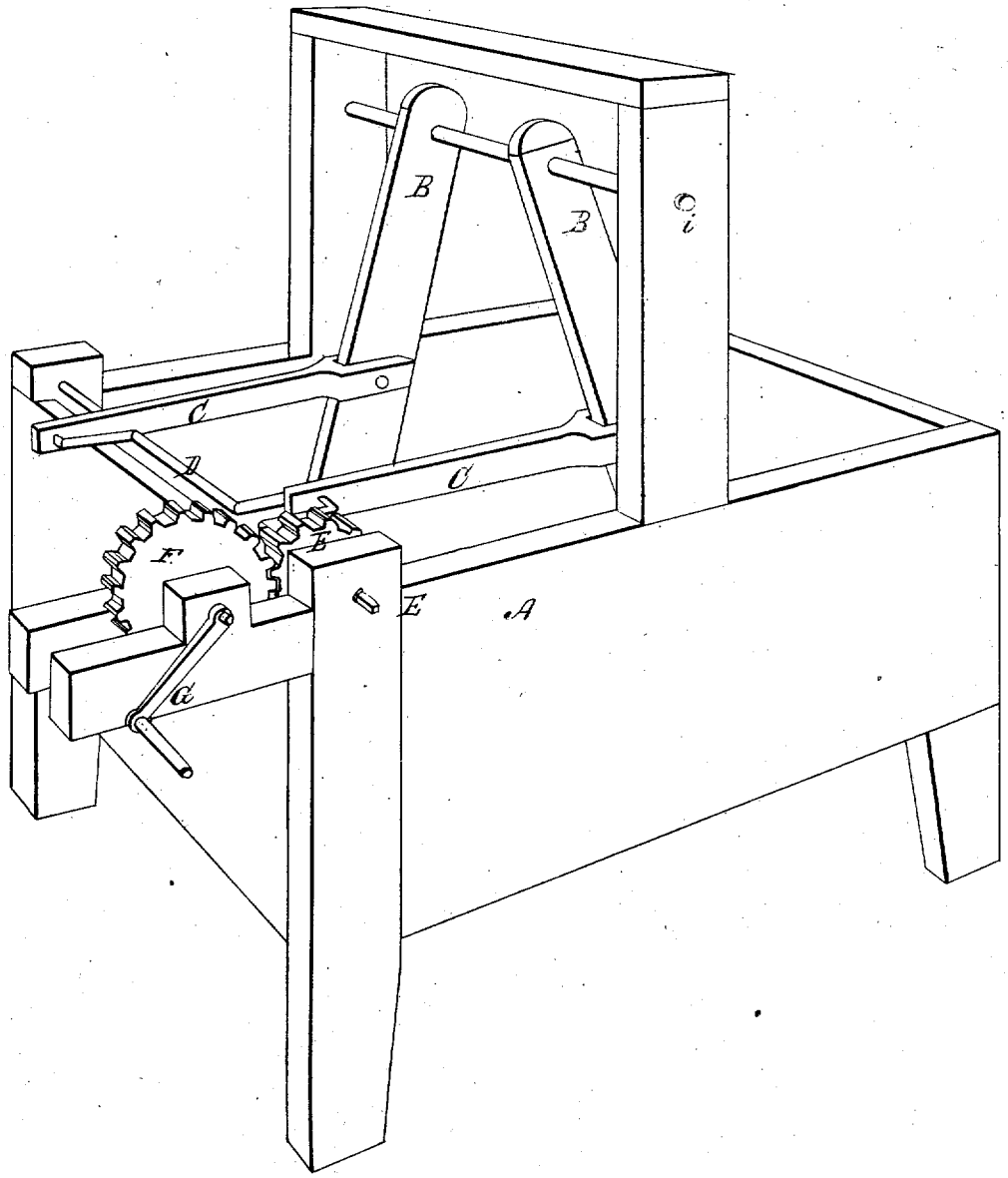
N. PETERS, PHOTO-LITHOGRAPHER, WASHINGTON, D. C.

Aug 27, 1835 Aug 28. 1835 381

David Warren
Letters Patent

9065X

The Schedule referred to in these Letters Patent and making part of
the same containing a description in the words of the said David Warren
himself of his improvement in the washing Machine.

---

To all to whom these presents shall come. Be it known that I David
Warren of Winthrop in the County of Kennebec & State of Maine have
invented a new and useful improvement in the washing Machine
and that the following is a full and exact description of the construction
and operation of the said machine as invented or improved by me
reference being made to the accompanying plate. A. is a cistern
made of any required dimensions. B. B. are arms to the bottom of which
are attached common stocks. C. C. are arms which are connected with
the double crank D. on this crank is placed a pinion E. which fits in-
to the cogwheel F. this cogwheel is moved by the crank G.. another
construction or modification which I sometimes adopt is the following)
I put the crank D. immediately thro' the arms B. B. dispensing with
the other apparatus. The usual method of operating however is to turn
the crank G. which propels the pinion E. and the crank D. and there-
by the stocks B. B. Claim. What I claim as my improvement is
1 The application of the gear work to the stocks as above described.
2. putting the crank directly through the arms of the stocks. In testimo-
ny that the above is a true specification of my said improvement as
above described I have hereunto set my hand this 30th day of
July 1835.

Witnesses
E. Holmes
Wm. Treat

David Warren

E. C.
Ch. W.

(Drawing)

255 [illegible]

drawing made